United States Patent [19]

Ejima et al.

[11] Patent Number: 4,954,897
[45] Date of Patent: Sep. 4, 1990

[54] ELECTRONIC STILL CAMERA SYSTEM WITH AUTOMATIC GAIN CONTROL OF IMAGE SIGNAL AMPLIFIER BEFORE IMAGE SIGNAL RECORDING

[75] Inventors: Satoshi Ejima, Tokyo; Tetsuya Yamamoto, Hasuda, both of Japan

[73] Assignee: Nikon Corporation, Tokyo, Japan

[21] Appl. No.: 406,865

[22] Filed: Sep. 13, 1989

Related U.S. Application Data

[63] Continuation of Ser. No. 194,897, May 17, 1988, abandoned.

[30] Foreign Application Priority Data

May 22, 1987 [JP] Japan .................................. 62-125641

[51] Int. Cl.$^5$ ............................................ H04N 5/238
[52] U.S. Cl. .................................. 358/228; 358/213.19
[58] Field of Search ................... 358/211, 228, 213.19, 358/909

[56] References Cited

U.S. PATENT DOCUMENTS

| | | | |
|---|---|---|---|
| 3,518,371 | 6/1970 | Brooks | 358/228 |
| 4,366,501 | 12/1982 | Tsunekawa et al. | 358/310 |
| 4,427,996 | 1/1984 | Tamura | 358/228 |
| 4,635,126 | 1/1987 | Kinoshita | 358/228 |
| 4,638,365 | 1/1987 | Kato | 358/228 |
| 4,686,572 | 8/1987 | Takatsu | 358/213.13 |

Primary Examiner—Stephen Brinich
Attorney, Agent, or Firm—Shapiro and Shapiro

[57] ABSTRACT

An electric still camera is provided with a device for varying the gain of an image signal amplifying circuit in response to the excess or deficiency of the amount of light from a flash unit, before the image signal is recorded.

7 Claims, 2 Drawing Sheets

ELECTRONIC STILL CAMERA SYSTEM WITH AUTOMATIC GAIN CONTROL OF IMAGE SIGNAL AMPLIFIER BEFORE IMAGE SIGNAL RECORDING

This is a continuation application of Ser. No. 194,897, filed May 17, 1988, now abandoned.

BACKGROUND OF THE INVENTION

1. Field of the Invention

The present invention relates to exposure control in an electronic still camera.

2. Related Background Art

In a photographing system employing conventional silver halide film, the photographing operation with flash has been conducted by regulating the lens diaphragm and the shutter speed at suitable values, causing a flash unit to emit light, integrating the amount of light reflected from the object with light integrating means simultaneously with said light emission and automatically interrupting the light emission of the flash unit by a light sensor provided in the camera or the flash unit when the amount of light reaches a value for obtaining an optimum exposure.

However the amount of light from the flash unit is limited, and it may be insufficient for obtaining optimum exposure for example because the object is too distant from the flash unit or the aperture of the lens diaphragm is adjusted too small. In order to predict such situation prior to the photographing operation, there has been required a preparatory operation such as precise calculation of photographing conditions by the operator, or automatic in-camera operation of irradiating the object with infrared light to simulate the actual light emission from the flash unit, thereby identifying whether the amount of light from the flash unit and the lens diaphragm are suitable for photographing.

However the former operation requires detailed knowledge of the operator on the camera operation, takes time and is cumbersome. On the other hand, the latter operation requires a complex and expensive apparatus. Also if such operation identifies the amount of light from the flash unit as insufficient, it has been required to alter the photographing conditions, to employ a more sensitive photographic film or to use a more powerful flash unit. For these reasons, in most photographing operations, such prior checking has not been conducted, but, if the amount of exposure is not enough due to the insufficient amount of light from the flash unit, alarm means on the camera is activated to inform the operator of such insufficient amount of light, thereby causing the operator to take the photograph again under readjusted conditions. However such system is very defective, because an image unsuitable for viewing is inevitably recorded in such case, and the opportunity of photographing may be easily lost.

The above-mentioned drawbacks of wasting a frame and losing the opportunity of photographing also exist when the object is too close. In such case the film may be exposed excessively as the interruption of light emission from the flash unit may be delayed due to the delay in the function of the control circuit of the flash unit.

Electronic still cameras have had similar problems in the use with a flash unit, as disclosed in U.S. Pat. No. 4,366,501. Since the latitude of exposure is narrower than in the conventional silver halide film, the problem of excessive or deficient amount of light from the flash unit is more serious, and a satisfactory solution for this problem has been heeded.

SUMMARY OF THE INVENTION

An object of the present invention is to provide an electronic still camera capable of recording an appropriate image signal regardless of the change in the amount of light emission from the flash unit.

The above-mentioned object can be achieved according to the present invention by providing means for varying the gain of an image signal amplifying means in response to the excess or deficiency of the amount of light from the flash unit, before the image signal is recorded.

DESCRIPTION OF THE PREFERRED EMBODIMENTS

Figure 1:
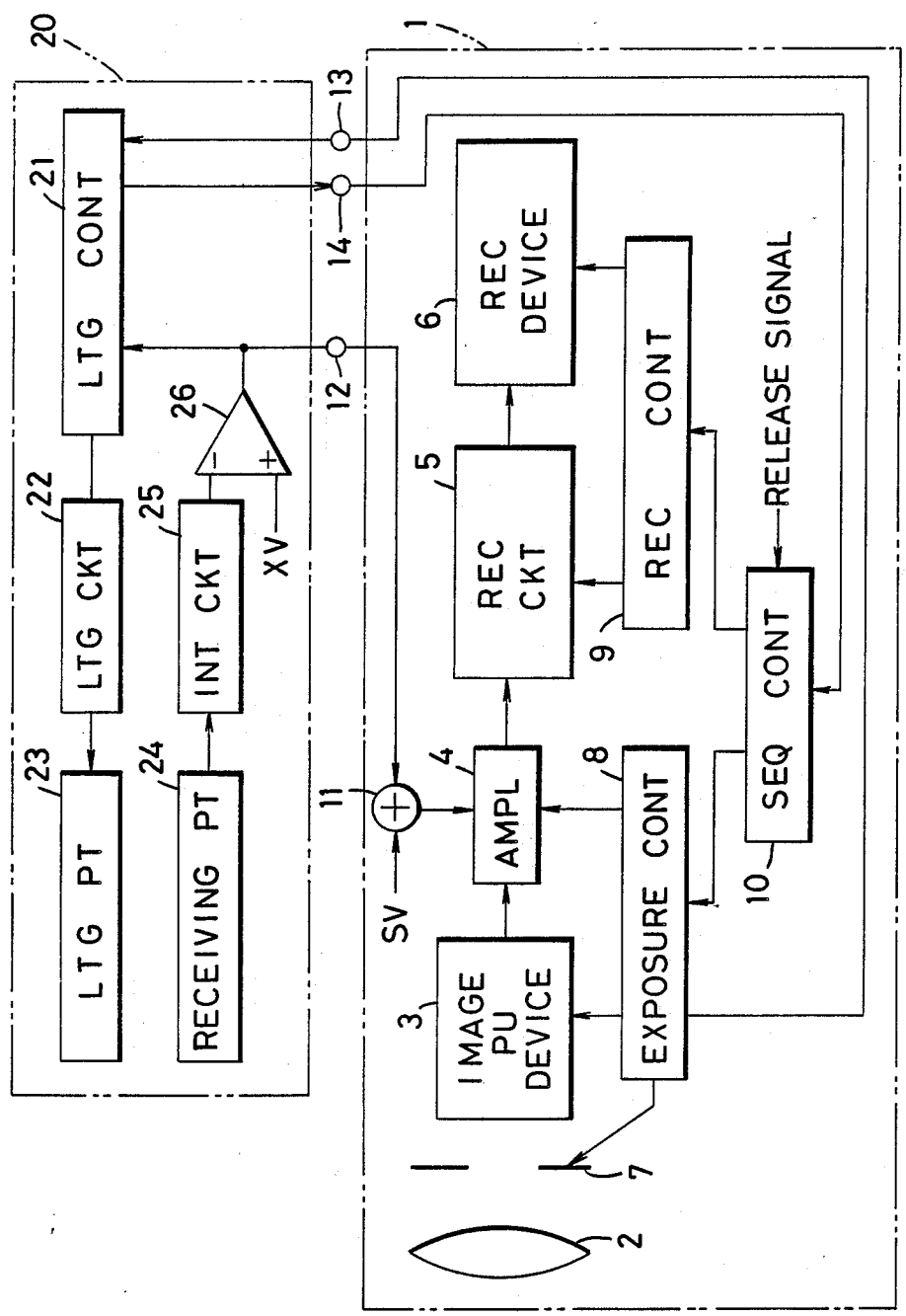
FIG. 1 is a block diagram of a first embodiment of the present invention.

In the following there will be given an explanation of the principle of the present invention.

As in the conventional camera, the automatic exposure control of an electronic still camera relies on the following apex condition:

$$BV + SV = AV + TV \qquad (1)$$

wherein BV, SV, AV and TV respectively represent luminosity of an object, sensitivity, diaphragm aperture and shutter speed in logarithms to the base 2. Different from the case of conventional silver halide film, the sensitivity SV is not specific to the solid-state image pickup device but is defined in the entire system of an electronic still camera, and can be varied by regulating the gain of an image signal amplifying circuit. In an image taking operation with a flash unit, BV and TV are determined by the amount of light from the flash unit. Thus, using an ideal amount XV of light to be emitted from the flash unit for obtaining an optimum exposure, there can be obtained an equation:

$$XV = BV - TV \qquad (2)$$

The equation (1) can be rewritten as follows, by means of said equation (2):

$$XV = AV - SV \qquad (3)$$

In practice, however, the flash unit may not emit such ideal light amount XV, and the actual light amount is represented as XV'. The difference between the ideal light amount XV and the actual light amount XV' is defined as a correction value $\alpha$ as follows:

$$\alpha = XV - XV' \qquad (4)$$

From the equations (4) and (3) there can be obtained:

$$XV' = AV - SV - \alpha \qquad (5)$$

The ideal light amount XV required in the image taking operation can be determined from the equation (3), and the actual light amount XV' can also be measured at the completion of light emission from the flash unit. Consequently it is possible to calculate the correction value α from the equation (4) at the completion of light emission from the flash unit. In the electronic still camera, there is a slight time lag between the exposure of the solid-state image pickup device and the signal recorded in a recording device, so that it is possible to calculate the correction value α during the time lag and adjust the camera to an effective sensitivity SV' represented by:

$$SV' = SV + \alpha \quad (6).$$

By substituting the equation (6) in the equation (5) there is obtained:

$$XV' = AV - SV' \quad (7)$$

The equation (7) is obtained by replacing XV and SV in the automatic exposure condition (3) with XV' and SV', and indicates that the automatic exposure condition can be satisfied even when the flash unit emits an actual light amount XV' instead of the ideal light amount XV, by replacing the sensitivity SV with the effective sensitivity SV'. A beautiful picture can be obtained by recording the output of the image signal amplifying circuit with the recording device.

FIG. 1 is a block diagram of an electronic still camera system constituting a first embodiment of the present invention. As shown in FIG. 1, the system is composed of a camera 1 and a flash unit 20, which are electrically connected through contact terminals 12, 13, 14. Naturally the camera 1 may be used singly without the flash unit 20 when it is unnecessary, or the camera 1 and the flash unit 20 may be integrally constructed in a single housing.

A light beam introduced through a photographing lens 2 of the camera 1 passes through a diaphragm 7 and is focused on a solid-state image pickup device 3. The solid-state image pickup device 3 employed in the present embodiment is an interline CCD image sensor as disclosed in U.S. Pat. No. 4,686,572, with variable accumulation time through electric control by a transfer gate. An image signal obtained by photoelectric conversion in the solid-state image pickup device 3 is amplified in a picture signal amplifying circuit 4 and is supplied to a recording circuit 5. The image signal, which is frequency modulated in the recording circuit 5, is recorded, in a recording device 6, through a recording head on a floppy disk (not shown) constituting a magnetic recording medium. The recording device 6 is equipped with a mechanism for rotating the disk, a recording head, and a mechanism for driving the recording head. The diaphragm 7 and the solid-state image pickup device 3 are connected to an exposure control circuit 8, while the recording circuit 5 and the recording device 6 are connected to a recording control circuit 9. The exposure control circuit 8 and recording control circuit 9 are connected to a sequence controller 10 which receives a release signal. An adder 11 receives a constant reference sensitivity SV at a (+)-terminal, and is connected, at the other (+)-terminal, to the contact terminal 12. The contact terminal 13 is connected to the exposure control circuit 8, and the contact terminal 14 is connected to the sequence controller 10.

The flash unit 20 is provided with a lighting control circuit 21, and a lighting control signal therefrom is supplied to a lighting circuit 22. A light current generated from the lighting circuit 22 causes light emission from a lighting part 23, thus illuminating the object. The light reflected by the object is partly received by the photographing lens 2 of the camera 1 and partly by a receiving part 24 of the flash unit 20. The receiving part 24 executes photoelectric conversion and logarithmic compression on the light reflected from the object, and sends a signal to an integrating circuit 25, which initiates integration in response to the start of light emission to the object. The output of the integrating circuit 25 is supplied to a (−)-terminal of a comparator 26, of which a (+)-terminal receives a constant reference light amount XV. The output of the comparator 26 is supplied to the lighting control circuit 21 and the contact terminal 12. The contact terminals 13, 14 are connected to the lighting control circuit 21.

In the following there will be explained the function of the first embodiment described above.

When a capacitor (not shown) in the flash unit 20 is charged and the lighting part 23 becomes ready for light emission, the lighting control circuit 21 sends a charge completion signal, indicating such ready state, to the sequence controller 10 through the contact terminal 14. Thus, identifying that the flash unit 20 is in a state ready for light emission, the sequence controller 10 switches the exposure control circuit 8 to a flash exposure mode.

When the operator depresses a shutter release switch (not shown) to send a release signal to the sequence controller 10, the controller 10 activates the recording control circuit 9, thus rotating the floppy disk in the recording device 6. Also in response to a signal from the sequence controller 10, the exposure control circuit 8 adjusts the diaphragm 7 to an aperture corresponding to the reference diaphragm value AV for the use of the flash unit. Also the exposure control circuit 8 controls the function of the solid-state image pickup device 3, thus starting the accumulation of signal charge corresponding to the light from the object. Simultaneously the exposure control circuit 8 sends a lighting start signal to the lighting control circuit 21 in the flash unit 20 through the contact terminal 13. Then the lighting control circuit 21 sends a lighting control signal to the lighting circuit 22, which in turn releases a lighting current to cause light emission from the lighting part 23, thereby illuminating the object. The light reflected by the object is partly received by the solid-state image pickup device 3 through the photographing lens 2, and partly received by the receiving part 24. The latter light is subjected to photoelectric conversion and logarithmic compression in the receiving part 24, and the amount of light is integrated in the integrating circuit 25 with the lapse of time. The output of the integrating circuit 25 represents the actual amount of light XV' which is emitted by the lighting part 23 and reflected by the object toward the camera, and increases from 0 with the lapse of time during light emission from the lighting part 23. The reference sensitivity and the diaphragm value of the camera 1 in this state are represented by SV and AV, so that the light emission from the lighting part 23 should be stopped when the actual light amount XV' becomes equal to the reference light amount XV represented by:

$$XV = AV - SV \quad (3).$$

Thus the comparator 26 compares the reference light amount XV with the actual light amount XV', and produces an output which is positive or negative respectively when the actual light amount XV' is smaller or larger. At the start of light emission from the lighting part 23, the output of the integrating circuit 25 is zero, so that the output of the comparator 26 is positive. The output of the integrating circuit 25 increases with the lapse of time, and the output of the comparator 26 changes from positive to negative when the actual light amount XV' becomes equal to the reference light amount XV. The output of the comparator 26 is supplied to the lighting control circuit 21, which, upon detecting the change of the output of comparator 26 from positive to negative, interrupts the lighting current of the lighting circuit 22, thereby terminating the light emission from the lighting part 23. In response to termination of the charge completion signal by the lighting control circuit 21, the sequence controller 10 identifies the end of light emission from the flash unit 20 and causes the exposure control circuit 8 to terminate the signal charge accumulation of the solid-state image pickup device 3. The signal charge accumulated in that device is supplied to the picture signal amplifying circuit 4, the gain of which determines the effective sensitivity SV' of the camera 1 and is determined by a gain control voltage, obtained as an output signal of the adder 11. The adder 11 receives the reference sensitivity SV and the output of the comparator 26, but the latter has just changed from positive to negative and is close to zero. Consequently the output of the adder 11 is nearly equal to SV, so that the gain of the picture signal amplifying circuit 4, or the effective sensitivity of the camera 1, becomes equal to SV. Consequently the light amount received by the camera 1, diaphragm value and sensitivity are represented by XV, AV and SV, thus satisfying the condition of automatic exposure:

$$XV = AV - SV \qquad (3).$$

The image signal amplified in the amplifying circuit is supplied to the recording circuit 5. The circuit 5 selects the recording of an image signal of a frame or the recording of an image signal of a field which is equal to a half of a frame, according to the signal from the recording control circuit 9, and effects frequency modulation of the image signal of a frame or a field. The frequency modulated image signal is then recorded, in the recording device 6, on the floppy disk to complete the image taking operation.

In the following there will be explained a case of insufficient light amount from the flash unit 20 when the object is too far from the flash unit 20.

When the object is distant from the flash unit 20, the luminosity of the object illuminated by the flash unit 20 is lowered. Consequently the light amount received by the receiving part 24 decreases, so that the increase of output of the integrating circuit 25 per unit time also decreases. As the amount of light emission from the flash unit 20 is finite, if the object is too distant from the flash unit 20, the charge in the capacitor of the flash unit 20 is exhausted and the light emission is terminated before the output of the integrating circuit 25 becomes equal to the reference light amount XV. Upon termination of the light emission from the flash unit 20, the lighting control circuit 21 terminates the charge completion signal, whereby the sequence controller 10 identifies the termination of the light emission from the flash unit 20 and causes the exposure control circuit 8 to terminate the signal charge accumulation of the solid-state image pickup device 3. Then the charge accumulated in the image pickup device 3 is supplied to the picture signal amplifying circuit 4, the gain of which is determined by the gain control voltage from the adder 11. The adder 11 receives the reference sensitivity SV and the output of the comparator 26. The output is the correction value $\alpha$ obtained by subtracting the actual light amount XV' from the reference light amount XV, as represented by the foregoing equation (4) $\alpha = XV - XV'$. In this manner the adder receives the correction value $\alpha$ from the comparator 26 and the reference sensitivity SV, and output the effective sensitivity SV' of the camera 1 as represented by:

$$\begin{aligned} SV' &= SV + \alpha \\ &= SV + XV - XV' \end{aligned} \qquad (8)$$

By substituting the equation (3):

$$SV + XV = AV$$

there is obtained:

$$SV' = AV - XV'$$

Therefore:

$$XV' = AV - SV' \qquad (9)$$

thus satisfying the apex condition. This indicates that the insufficient exposure resulting from the insufficient light amount of the flash unit 20 is compensated by the increase in the sensitivity of the camera, and an appropriate exposure can be obtained as indicated by the equation (9).

The above-explained operation is effective also in case of an excessive exposure resulting from the excessive light amount of the flash unit.

If the object is close to the flash unit 20, the luminosity of the object increases, so that the increase of the output of the integrating circuit 25 per unit time also increases. Thus, if the object is too close to the flash unit 20, the actual light amount XV' becomes larger than the reference light amount XV because of a slight delay in the shift of output of the comparator 26 from positive to negative and in the function of the lighting control circuit 21 to interrupt the light emission from the lighting part 23. In such case the correction value $\alpha$ from the comparator 26 assumes a negative value, and, as indicated by the equation (8), the sensitivity of the camera is set by the adder 11 lower than the reference sensitivity SV. The excess in the light emission from the flash unit is compensated by a lower setting of the sensitivity of the camera, and an appropriate exposure is eventually obtained as indicated by the equation (9).

In the following there will be explained a second embodiment of the present invention shown in FIG. 2. Since most of the components are the same as those in FIG. 1, only those that are different will be explained in the following.

Figure 2:
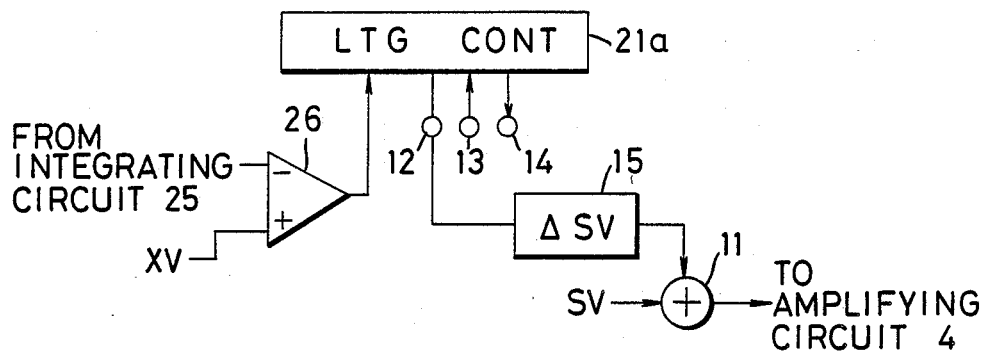
FIG. 2 is a block diagram of a part of a second embodiment of the present invention.

In the embodiment shown in FIG. 2, the contact terminal 12 receives an insufficient light amount signal from a lighting control circuit 21a, and the output of the comparator 26 is supplied only to the lighting control circuit 21a. The contact terminal 12 is connected to the input terminal of a supplementary sensitivity generating circuit 15, the output of which is supplied to an input terminal of the adder 11. The supplementary sensitivity generating circuit 15 is so constructed as to generate a signal "0" in response to an input signal "0", or a supplementary sensitivity value ΔSV in response to an input signal "1", and said output signal is supplied to the adder 11. The present embodiment is the same as the embodiment shown in FIG. 1, except for the circuits 21a, 15 and 11.

In the following there will be explained the function of the second embodiment shown in FIG. 2.

As in the first embodiment, the light emission from the lighting part 23 is triggered by the release signal, and, when the output of the integrating circuit 25 reaches a light amount XV suitable for exposure, the output of the comparator 26 changes to zero to terminate the light emission from the flash unit 20. In this situation the signal level from the lighting control circuit 21 to the supplementary sensitivity generating circuit through the terminal 12 is zero. Consequently the output of the supplementary sensitivity generating circuit 15 is zero, and the effective sensitivity of the camera, determined by the output of the adder 11 becomes SV+0=SV. Therefore the diaphragm value, light amount and sensitivity become respectively equal to AV, XV and SV, thus satisfying the equation (3) and achieving an appropriate exposure. Subsequently recording is conducted by the recording device 6 as in the first embodiment. In the following there will be explained a case of insufficient amount of light due to an excessive distance between the object and the flash unit 20. If the luminosity of the object is low due to a large distance thereof from the flash unit 20, the output of the integrating circuit 25 does not reach the reference light amount XV. Then, after the lapse of a predetermined time from the start of light emission, or when the charge accumulated in the capacitor is exhausted, the lighting control circuit 21 sends a level-1 signal, through the contact terminal 12, to the supplementary sensitivity generating circuit 15, which, in response, generates a fixed supplementary sensitivity value ΔSV. Consequently the output of the adder 11 becomes SV+ΔSV, and the effective sensitivity of the camera becomes equal to SV′=SV+ΔSV. Thus the image information is recorded by the recording device in the same manner as in the first embodiment.

The above-explained second embodiment does not rigorously satisfy the apex condition, but is to prevent the failure in photographing resulting from insufficient light amount to a certain extent by automatically increasing the sensitivity of the camera by a supplementary sensitivity value ΔSV in case the amount of light from the flash unit is insufficient.

In the following there will be explained a third embodiment of the present invention shown in FIG. 3. As most of the components the are same as those in FIG. 1, only those that are different will be explained in the following.

Figure 3:
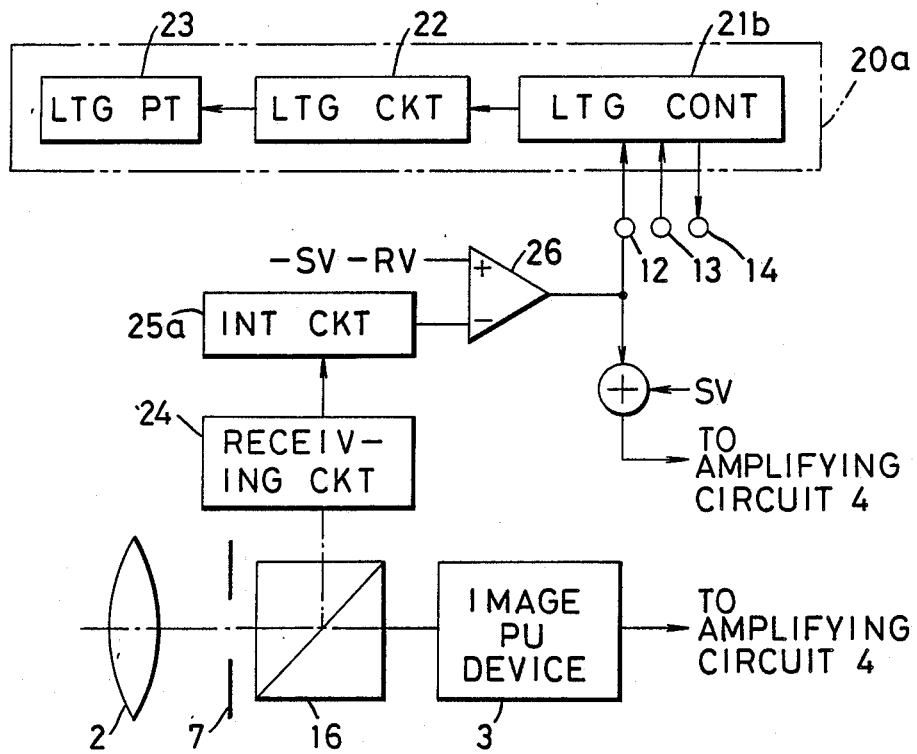
FIG. 3 is a block diagram of a part of a third embodiment of the present invention.

In the embodiment shown in FIG. 3, the receiving part 24, integrating circuit 25a and comparator 26, which are provided in the flash unit 20 in the embodiment shown in FIG. 1, are provided in the camara 1. However the integrating operation of the integrating circuit 25a is initiated substantially simultaneously with the start of signal charge accumulation of the solid-state image pickup device 3 triggered by the exposure control circuit. The receiving part 24 receives a light beam split by a beam splitter 16 provided between the diaphragm 7 and the solid-state image pickup device 3 thereby enabling so-called TTL exposure control. The comparator 26 receives, at the (+)-terminal, constant exposure reference voltage (−SV−RV) obtained by subtracting the reflectivity RV of the beam splitter 16 from the negative value of the reference sensitivity SV of the camera 1, and, at the (−)-terminal, the output of the integrating circuit 25a which is obtained by logarithmic compression of the integrated light amount divided by the beam splitter 16. The remaining structure is the same as in FIG. 1.

In the following there will be explained the function of the third embodiment shown in FIG. 3.

When the object is illuminated by the light emission from the lighting part 23 as in the first embodiment, a part of the light reflected by the object enters the photographic lens 2, and a part of the light beam transmitted by lens 2 is divided by the beam splitter 16 and enters the receiving part 24 and is subjected to photoelectric conversion and logarithmic compression therein. It is then integrated in the integrating circuit 25a, which provides an exposure voltage (XV′−AV−RV) which is obtained by subtracting the aperture value AV of the diaphragm 7 and the reflectivity RV of the beam splitter 16 from the actual light amount XV′ of the flash unit after reflection by the object and entry into the photographic lens 2. The comparator 26 compares the exposure voltage (XV′−AV −RV) with the exposure reference voltage (−SV−RV) and produces an output:

$$\alpha = (-SV - RV) - (XV' - AV - RV) \quad (10)$$
$$= -SV - (XV' - AV)$$

The value α is positive soon after the light emission from the flash unit because the light amount XV′ is close to zero. However light amount XV′ increases with time so that α reaches zero and turns to negative. At the moment of α=0, when the output of the comparator 26 is also 0, the equation (4) can be transformed with the condition α=0 as follows:

$$XV'=AV-SV \quad (11)$$

In this state the light control circuit 21 identifies a condition α=0 through the contact terminal 12 and sends a lighting termination signal to the lighting circuit 22, thereby terminating the light emission from the lighting part 23. The output of the adder 11, for determining the gain of the picture signal amplifying circuit 4 or the effective sensitivity SV′ of the camera, is equal to the sum of the reference sensitivity SV and the output α of the comparator 26 as follows:

$$SV' = SV + \alpha$$

Since α=0 in this state, the effective sensitivity SV′ of the camera is equal to SV. Consequently the effective sensitivity SV, diaphragm value AV, and actual light amount XV′ of the flash unit entering the photographing lens 2 satisfy the condition of appropriate exposure according to the equation (11). The image signal amplified in the picture signal amplifying circuit 4 is finally recorded in the recording device 6 as in the first embodiment.

In the following there will be explained a case in which the output α of the comparator 26 does not become equal to zero due to an insufficient amount of light of the flash unit for example by an excessive distance between the flash unit and the object or by an excessively small aperture of the diaphragm, or due to an excessive amount of light for example by an excessively small distance between the flash unit and the object or by an excessively large aperture of the diaphragm.

According to the equation (10), $\alpha = -SV - (XV' - AV)$, and the effective sensitivity SV' obtained from the adder 11 is equal to the sum of $\alpha$ and SV. Therefore:

$$\begin{aligned} SV' &= SV + \alpha \\ &= SV - SV - (XV' - AV) \\ &= AV - XV' \end{aligned}$$

This equation can be rewritten as:

$$XV' = AV - SV' \quad (12)$$

This is equivalent to the equation (9), so that the effective sensitivity SV', diaphragm value AV and actual light amount XV' entering the photographing lens 2 from the flash unit satisfy the condition of appropriate exposure. The image signal amplified in the picture signal amplifying circuit 4 is recorded in the recording device 6.

If the flash unit is not used in this third embodiment, an appropriate exposure can be obtained by regulating the effective sensitivity SV' of the samera, even in the presence of an error in the shutter speed TV, an error in the measurement of the luminosity of the object, and an error in the setting of the diaphragm value AV.

In case of an image taking operation without the flash unit 20a, the exposure voltage obtained from the integrating circuit 25a immediately after the completion of exposure of the solid-state image pickup device 3 is represented by $(BV' - TV' - AV' - RV)$, wherein TV' is the actual shutter speed, AV' is the actual diaphragm aperture, BV' is the actual object luminosity, and RV is the reflectance of the beam splitter 16. The exposure voltage $(BV' - TV' - AV' - RV)$ is compared with the exposure reference voltage $(-SV - RV)$ in the comparator 26, the output $\alpha$ of which is represented by:

$$\begin{aligned} \alpha &= (-SV - RV) - (BV' - TV' - AV' - RV) \\ &= TV' + AV' - (SV + BV') \end{aligned}$$

Since the effective sensitivity SV' obtained from the adder 11 is equal to the sum of $\alpha$ and SV:

$$\begin{aligned} SV' &= SV + \alpha \\ &= TV' + AV' - BV' \end{aligned}$$

This relation can be rewritten as:

$$BV' + SV' = AV' + TV'$$

indicating that the apex condition can be satisfied by regulating the sensitivity SV of the camera at the image taking operation. Therefore, even when the flash unit is not in use, the third embodiment can achieve appropriate automatic exposure despite errors in the diaphragm aperture or in the luminosity measurement.

In the foregoing embodiments of the present invention there has been employed a solid-state image pickup device with an electric shutter function through the control of a voltage applied to a transfer gate, but the present invention can be also achieved by employing a mechanical shutter between the diaphragm and the solid-state image pickup device and controlling the mechanical shutter instead of providing the image pickup device with the electrical shutter function.

We claim:

1. An electronic still camera comprising:
    an optical system for forming an image of an object from light from the object;
    image pickup means for accumulating charges corresponding to the image of the object and thereby producing an image signal;
    amplifier means for amplifying said image signal;
    recording means for recording said image signal from said amplifier means on a recording medium;
    flash means for emitting a flash of light toward the object substantially simultaneously with the start of charge accumulation of said image pickup means;
    generating means for generating a photoelectric signal corresponding to the intensity of light from said object;
    integration means for integrating said photoelectric signal and producing an integration signal corresponding to the result of said integration, said integration means initiating the integration of said photoelectric signal substantially simultaneously with the start of charge accumulation of said image pickup means;
    comparator means for comparing the value of said integration signal with a reference value and producing a comparison signal corresponding to the difference between the value of said integration signal and said reference value; and
    gain adjusting means, dependent upon said comparison signal, for adjusting the gain of said amplifier means substantially upon termination of charge accumulation of said image pickup means before recording said image signal on the recording medium.

2. An electronic still camera according to claim 1, which further comprises another optical system positioned between the first-mentioned optical system and said image pickup means, wherein said another optical system reflects part of the light from said first-mentioned optical system toward said generating means, and wherein said reference value is dependent upon the reflectivity of said another optical system.

3. An electronic still camera according to claim 1, wherein said gain adjusting means adjusts the gain of said amplifier means so that the gain of the amplifier means is substantially equal to the sum of a predetermined gain and a supplementary gain corresponding to said difference.

4. An electronic still camera according to claim 1, wherein said gain adjusting means detects that the value of said integration signal is smaller than said reference value and adjusts the gain of said amplifier means in such a manner that the gain thereof increases by a predetermined amount.

5. An electronic still camera according to claim 1, wherein said generating means is separate from said image pickup means.

6. An electronic still camera comprising:
    an optical system for forming an image of an object from light from the object;
    image pickup means for accumulating charges corresponding to the image of the object formed by said optical system, thereby producing an image signal;
    amplifier means for amplifying said image signal;
    recording means for recording said image signal from said amplifier means on a recording medium;

generating means for generating a photoelectric signal corresponding to the intensity of light from said object;

integration means for integrating said photoelectric signal and producing an integration signal corresponding to the result of said integration;

control means for causing said integration means to initiate the integration of said photoelectric signal substantially simultaneously with the start of charge accumulation of said image pickup means;

comparator means for comparing the value of said integration signal with a reference value and producing a comparison signal corresponding to the difference between the value of said integration signal and said reference value; and gain adjusting means dependent upon said comparison signal for adjusting the gain of said amplifier means substantially upon termination of charge accumulation of said image pickup means before said image signal is recorded on the recording medium.

7. An electronic still camera according to claim 6, wherein said generating means is separate from said image pickup means.

* * * * *